(12) United States Patent
Murphey (10) Patent No.: US 12,031,572 B2
(45) Date of Patent: Jul. 9, 2024

(54) LIVING HINGE BOOM

(71) Applicants: Opterus Research and Development, Inc., Fort Collins, CO (US); Thomas W. Murphey, Fort Collins, CO (US)

(72) Inventor: Thomas W. Murphey, Fort Collins, CO (US)

(73) Assignee: Opterus Research and Development, Inc., Fort Collins, CO (US)

( * ) Notice: Subject to any disclaimer, the term of this patent is extended or adjusted under 35 U.S.C. 154(b) by 536 days.

(21) Appl. No.: 17/335,522

(22) Filed: Jun. 1, 2021

(65) Prior Publication Data

US 2021/0372464 A1    Dec. 2, 2021

Related U.S. Application Data

(60) Provisional application No. 63/033,378, filed on Jun. 2, 2020.

(51) Int. Cl.
*B64G 1/22* (2006.01)
*F16C 11/12* (2006.01)
*E04C 3/00* (2006.01)

(52) U.S. Cl.
CPC .............. *F16C 11/12* (2013.01); *B64G 1/222* (2013.01); *E04C 3/005* (2013.01)

(58) Field of Classification Search
CPC .... B64G 1/222; B64G 1/2221; B64G 1/2225; B64G 1/2227
USPC ...................................................... 244/172.6
See application file for complete search history.

(56) References Cited

U.S. PATENT DOCUMENTS

| 3,508,587 | A | 4/1970 | Mauch | |
|---|---|---|---|---|
| 3,811,633 | A | 5/1974 | Cummings et al. | |
| 6,266,030 | B1 * | 7/2001 | Warren | B64G 1/222 343/915 |
| 6,357,733 | B1 * | 3/2002 | Wulz | C04B 35/5805 267/158 |
| 6,374,565 | B1 * | 4/2002 | Warren | E04B 1/3441 138/119 |
| 6,910,304 | B2 * | 6/2005 | Warren | E04H 3/28 52/646 |
| 7,354,033 | B1 * | 4/2008 | Murphey | B64G 1/222 52/653.2 |
| 8,893,442 | B1 * | 11/2014 | Spence | B64G 1/222 52/653.2 |

(Continued)

FOREIGN PATENT DOCUMENTS

| CA | 3204764 A1 * | 9/2022 | ............. B64G 1/222 |
|---|---|---|---|
| DE | 19713043 A1 * | 1/1998 | ............. B29C 65/54 |

(Continued)

OTHER PUBLICATIONS

International Search Report and Written Opinion for corresponding International Application No. PCT/US21/35202 date of mailing Sep. 16, 2021 (14 pgs.).

*Primary Examiner* — Christopher P Ellis
(74) *Attorney, Agent, or Firm* — Harris Beach PLLC (57) ABSTRACT

A deformable boom device includes a pair of shells, each shell of a substantially same arc length. A pair of hinges is mechanically coupled to the pair of shells to join the pair of shells into an open cross section as deployed in an extended state, and into about a flat structure in a flattened state. At least one of the pair of shells can include an about semi-circular cross section.

24 Claims, 9 Drawing Sheets

(56) References Cited

U.S. PATENT DOCUMENTS

| | | | | |
|---|---|---|---|---|
| 9,120,583 | B1* | 9/2015 | Spence | B64G 1/222 |
| 9,205,629 | B2* | 12/2015 | Livingston-Peters | B29C 59/16 |
| 9,919,815 | B2* | 3/2018 | Steele | B64G 1/443 |
| 9,996,108 | B2* | 6/2018 | Morrison | G06F 1/1681 |
| 10,411,363 | B2* | 9/2019 | Ceely | H01Q 1/288 |
| 10,715,078 | B2* | 7/2020 | Jeon | F16M 11/38 |
| 11,034,467 | B2* | 6/2021 | Murphey | B64G 1/443 |
| 2002/0112417 | A1* | 8/2002 | Brown | B64G 99/00 52/645 |
| 2002/0124518 | A1* | 9/2002 | Warren | B64G 99/00 52/646 |
| 2003/0182878 | A1* | 10/2003 | Warren | E04C 3/005 52/108 |
| 2005/0022465 | A1* | 2/2005 | Warren | B64G 1/222 52/653.2 |
| 2014/0230949 | A1 | 8/2014 | Daton-Lovett | |
| 2016/0177567 | A1 | 6/2016 | Gandhi | |
| 2020/0122864 | A1* | 4/2020 | Murphey | B64G 1/222 |
| 2021/0387750 | A1* | 12/2021 | Fernandez | B64G 1/222 |
| 2022/0098861 | A1* | 3/2022 | Fernandez | E04C 3/005 |
| 2022/0267029 | A1* | 8/2022 | Murphey | E04C 3/005 |
| 2022/0402632 | A1* | 12/2022 | Yamamoto | B64G 1/222 |
| 2023/0373659 | A1* | 11/2023 | Rakow | B64G 1/222 |

FOREIGN PATENT DOCUMENTS

| | | | | |
|---|---|---|---|---|
| FR | 3067378 B1 * | 8/2019 | | B64G 1/222 |
| JP | 6044029 B2 | 12/2016 | | |
| WO | WO-1999055999 A1 | 11/1999 | | |
| WO | WO-2018013905 A2 * | 1/2018 | | B64G 1/222 |
| WO | WO-2018191256 A1 * | 10/2018 | | B64G 1/222 |
| WO | WO-2022029827 A1 * | 2/2022 | | B32B 15/02 |

\* cited by examiner

LIVING HINGE BOOM

CROSS-REFERENCE TO RELATED APPLICATIONS

This application claims priority to and the benefit of U.S. provisional patent application Ser. No. 63/033,378, LIVING HINGE BOOM, filed Jun. 2, 2020, which application is incorporated herein by reference in its entirety.

FIELD OF THE APPLICATION

The application relates to deformable structures, particularly to deformable flattened and roll stowed deployable booms.

BACKGROUND

Deformable structures are structures that can dramatically change shape. Deformable structures can provide relatively strong and lightweight stowable beams or booms, such as can be used in space by spacecraft including satellites.

SUMMARY

A deformable boom device includes a pair of shells, each shell of a substantially same arc length. A pair of hinges is mechanically coupled to the pair of shells to join the pair of shells into an open cross section as deployed in an extended state, and into about a flat structure in a flattened state. At least one of the pair of shells can include an about semi-circular cross section. A stiffness and strength of a deformable boom in the extended state is greater than a different stiffness and a strength of the deformable boom in the flattened state, the deformable boom deformable along a long axis.

At least in part in the flattened state, the deformable boom device can be rolled into a roll for storage.

The pair of hinges can include a long dimension of about less than 25% of a circumference of an outer diameter of a deformable boom. The pair of hinges can include a long dimension of more than about 80% of a circumference of an outer diameter of a deformable boom. The pair of hinges can include a strip disposed on an inner surface of the deformable boom device. The pair of hinges can include a strip disposed on an outer surface of the deformable boom device. Each hinge can butt against a shell end, such that both of the shell and the hinge form one substantially continuous non overlapped layer.

The pair of hinges can include a strip of an elastic material. The pair of hinges can include a strip of a ductile material. The pair of hinges can include a material having a plastic behavior. The pair of hinges can include a polyimide film material. The pair of hinges can include a +45/−45 fiber orientation. The pair of hinges can include a localized thinning of otherwise continuous shells.

The pair of shells can include at least two layers. The pair of shells can include a resilient material. The pair of shells can include an elastic material. The pair of shells can include a composite material. The pair of shells can include a carbon composite material. The pair of shells can include a material having a different ply or fiber orientation.

A first shell layer can include a +45/−45 ply or a +45/−45 fiber orientation and another shell layer can include a 0/90 ply or a 0/90 ply fiber orientation.

In some LHB, the pair of shells does not intersect tangentially. In some LHB, the pair of shells does not share a coincident center point.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

Definitions

Common definitions and understanding by those skilled in the art, as for example defined by Wikipedia, are used for the following terms.

In the description hereinbelow, the materials of the "shells" generally exhibit characteristics of resilience and elasticity.

Resilience—Resilience is the ability of a material to absorb energy when it is deformed elastically, and release that energy upon unloading. <https://en.wikipedia.org/wiki/Resilience_(materials_science)>. Resilient materials can be nonlinear and viscoelastic. Resilient materials include elastic materials.

Elasticity—Elasticity is the ability of a body to resist a distorting influence and to return to its original size and shape when that influence or force is removed. Solid objects will deform when adequate forces are applied to them. If the material is elastic, the object will return to its initial shape and size when these forces are removed. Hooke's law states that the force should be proportional to the extension. The physical reasons for elastic behavior can be quite different for different materials. In metals, the atomic lattice changes size and shape when forces are applied (energy is added to the system). When forces are removed, the lattice goes back to the original lower energy state. <https://en.wikipedia.org/wiki/Elasticity_(physics)>. Elastic generally implies a lack of viscoelastic properties which are typically linear elastic.

In the description hereinbelow, the materials of the "hinges" generally exhibit characteristics of plasticity and ductility.

Plasticity—Plasticity, also known as plastic deformation, is the ability of a solid material to undergo permanent deformation, a non-reversible change of shape in response to applied forces. For example, a solid piece of metal being bent or pounded into a new shape displays plasticity as permanent changes occur within the material itself. The transition from elastic behavior to plastic behavior is known as yielding. <https://en.wikipedia.org/wiki/Plasticity_(physics)>.

Ductility—Ductility is a measure of a material's ability to undergo significant plastic deformation before rupture or breaking, which may be expressed as percent elongation or percent area reduction from a tensile test. Ductility is often characterized by a material's ability to be stretched into a wire. <https://en.wikipedia.org/wiki/Ductility>.

When the hinges are flattened and the material yield stress is exceeded, the hinges yield.

Yield—The yield point is the point on a stress-strain curve that indicates the limit of elastic behavior and the beginning of plastic behavior. Prior to the yield point, a material will deform elastically and will return to its original shape when the applied stress is removed. Once the yield point is passed, some fraction of the deformation will be permanent and non-reversible and is known as plastic deformation.

As described hereinabove, Deformable structures are structures that can dramatically change shape. Deformable structures can provide relatively strong and lightweight stowable beams or booms, such as can be used in space by spacecraft including satellites. Some exemplary deformable structures were described in U.S. Pat. No. 10,526,785, DEFORMABLE STRUCTURES, which is also assigned to Opterus Research and Development, Inc. The '785 patent is incorporated herein by reference in its entirety for all purposes.

Living Hinge Boom—A Living Hinge Boom (LHB) includes two shells of a resilient material connected by hinges that allow a deployed cross section boom, to flatten. Once flattened, an LHB can be rolled for storage.

Figure 1:
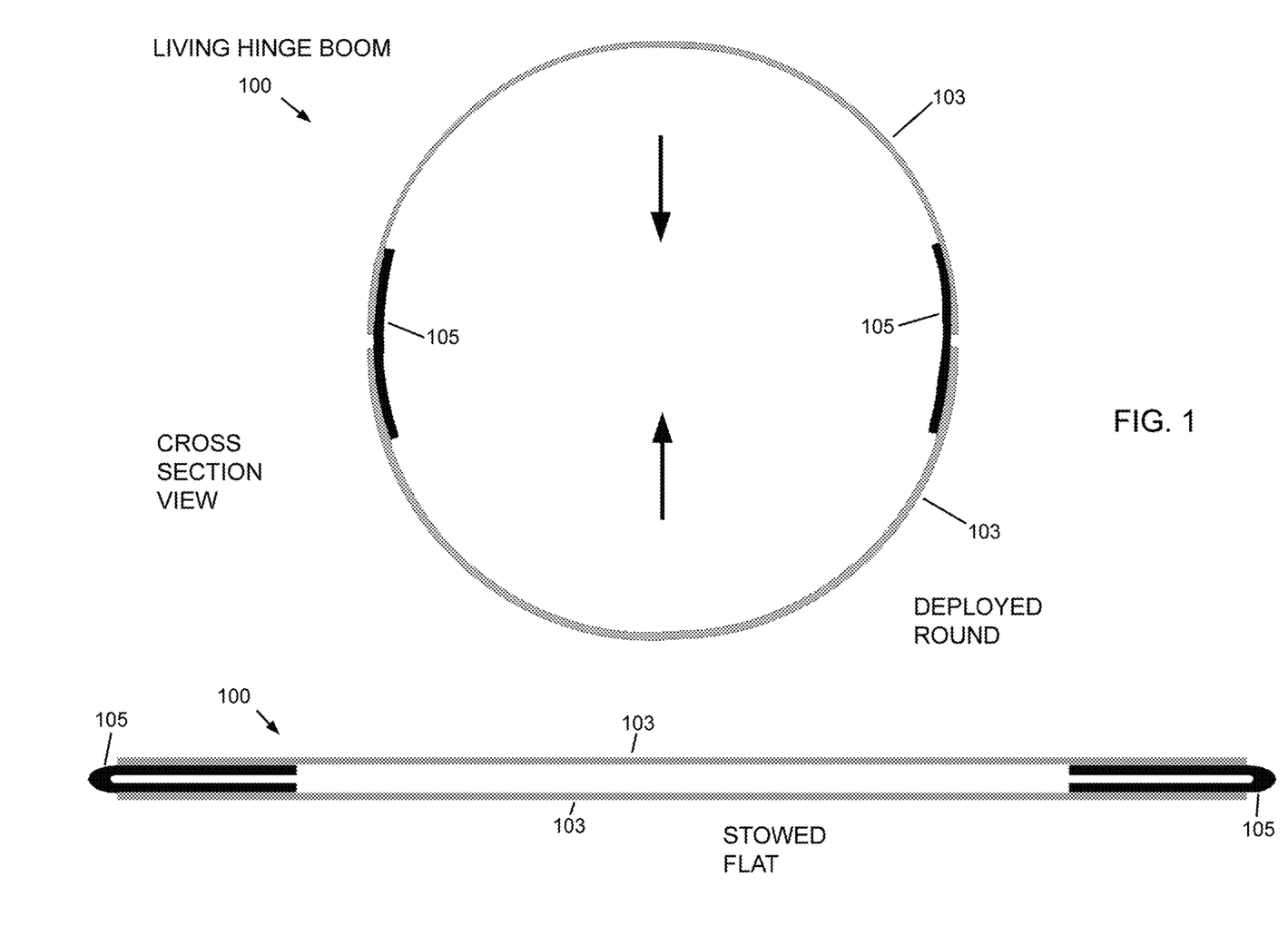
FIG. 1 is a drawing showing an LHB in a deployed state, with an about circular cross section, and then flattened into a flat state.

FIG. 1 is a drawing showing an exemplary LHB 100 in a deployed state, with an about circular cross section (top), then flattened into a flat state (bottom). Semi-circular shells 103 of a resilient material are mechanically coupled together at each end of each semi-circular shell 103 by hinges 105 of a resilient material. In the deployed state, both hinges 105 are open.

The two arrows of the deployed state, with an exemplary about circular cross section show how when pressed flat, each of the shells 103 become about flat when the hinges 105 are both closed.

Each side of each hinge 105 can be joined or mechanically coupled to each end of each semi-circular shell 103 by any suitable fastening means, including any suitable adhesive, glue, mechanical fasteners, etc. The semi-circular shells 103 can be made from any suitable resilient material, including elastic materials. The hinges 105 can be made from any suitable resilient material, including elastic materials. The shell ends are the long longitudinal side portions of each of the semi-circular shells 103 which side portions, are joined by each of the pair of hinges 105 to form the living hinge boom. It is unimportant how much overlap there is between each side of each hinge and the shell ends. For example, in the exemplary LHB of FIG. 1, there is less than about 20% overlap of the hinge sides and the shell ends. However, for example, in an LHB according to FIG. 3, the hinge 105 can extend about 360° around both semi-circular shells 103. The hinges can also abut the shell ends where the hinges are abutting the shell ends in a single layer with the shells.

Hinges can also be formed by localized thinning of otherwise continuous shells. For example, a LHB can be made by an extrusion or pultrusion process, where the hinges are thinner regions of the boom.

Example—A LHB was made with two elastic composite shells. Any suitable composite materials can be used. The two elastic composite shells were connected by polymer hinges. Any suitable polymer can be used. The boom can be flattened, then rolled.

Boom cross section—Any suitable cross section can be used which provides a given closed curve cross section as deployed in an extended state, and an about flat structure in a flattened state. The two shells of the pair of shells each have a substantially same arc length so that the hinges align when the two shells are flattened.

Figure 13:
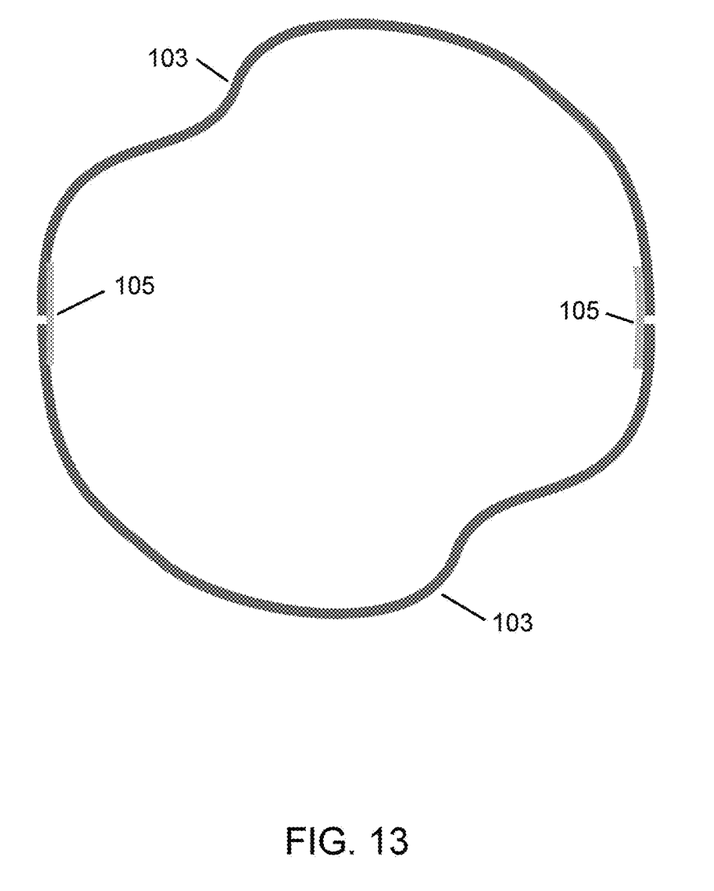
FIG. 13 is a drawings showing an exemplary LHB cross section having multiple curves.

The cross section can be circular as shown in many of the exemplary LHB of the drawings, or, for example, there can be a cross section with multiple curves. FIG. 13 is a drawings showing an exemplary LHB cross section having multiple curves. Both shells of the pair of LHB shells have a substantially same arc length so that when the hinges fold, the two shells are flattened. Where the two shells each have substantially the same arc length, they can be assembled with hinges so that both shells and therefore, the LHB folds flat.

Shells—When relaxed, not subject to a flattening force, the shells take on a curved cross section. The shells are typically made of a structural material with a high modulus and high strength. The elasticity of each shell material applies enough force to exceed the yield stress in the hinge material allowing the boom to open.

Differences between the two shells of an LHB—The shells can have a same or different cross section curves. The shells can have a same or different open cross section. The shells do not need to intersect tangentially.

For example, the two shells can be circular but not share a coincident center point. The resulting shells will intersect at angles greater to or less than tangential. Using this approach, a boom cross-section can be tailored to optimize the relative balance of bending and torsional structural properties. For example, a boom can be made stiffer when bending about one axis than another.

Figure 14A:
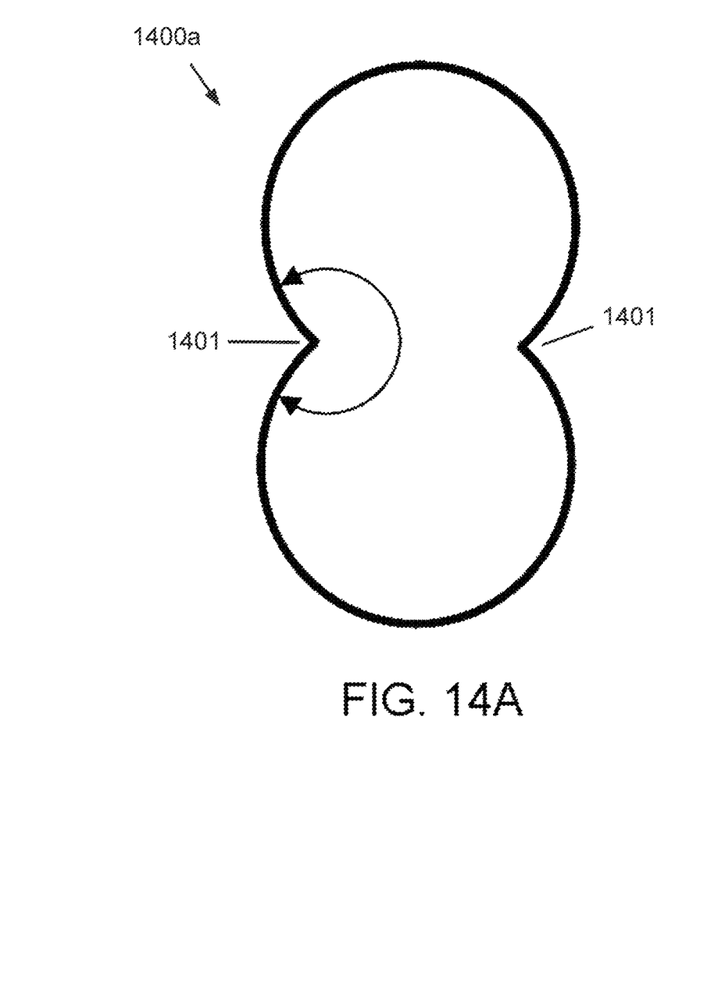
FIG. 14A is a drawing showing an exemplary LHB having hinges with a non-tangential shell intersection greater than tangential.
Figure 14B:
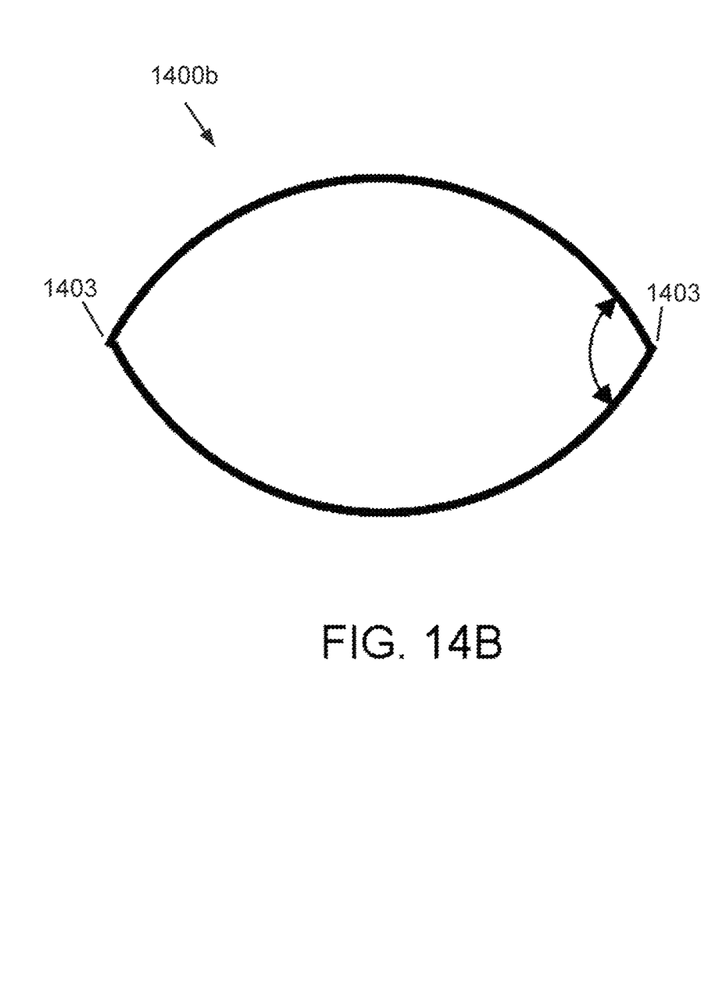
FIG. 14B is a drawing showing an exemplary LHB having hinges with a non-tangential shell intersection less than tangential.

FIG. 14A and FIG. 14B show exemplary LHB which are circular, however not sharing a coincident center point. FIG. 14A is a drawing showing an exemplary LHB 1400a where there are hinges 1401 with a non-tangential shell intersection greater than tangential. An LHB 1400a has greater vertical bending properties compared to horizontal bending.

FIG. 14B is a drawing showing an exemplary LHB 1400b where there are hinges 1403 with a non-tangential shell intersection less than tangential. An LHB 1400b has greater horizontal bending properties compared to vertical bending. Some originally circular LHB can end up looking like the LHB of FIG. 14B because they don't fully recover their cross section after being stored flat for a while.

The exemplary semi-circular shells, such as when made of composite materials, can be formed around a rigid tube. Suitable manufacturing techniques include metal forming and composites fabrication processes, molding processes, winding and pultrusion processes. Suitable materials include spring metals; carbon, glass, and organic fiber reinforced plastics.

Hinges—The hinges join each of the pair of shells into an open cross section. The hinges are attached or extend from each end of each arc of each shell in cross section. For example, where the shells are oriented on top and bottom, a first hinge hingedly couples a left side of each arc to each other in cross section, and a second hinge hingedly couples a right side of each arc to each other in cross section.

The hinges are living hinges. Living hinges typically do not exhibit resiliency. Suitable hinge materials include materials with a plastic behavior. The hinge material is typically a plastic or ductile material that yields at a low stress.

When relaxed, and not subject to a flattening force, the hinges can be flexible about flat or can have a curvature to about match the curvature of the semi-circular shells. The hinge material can be made either continuous around the tube circumference or incorporated as narrow strips. Hinges can be, for example, cut from sheet material of a resilient material, such as, sheets of any suitable polymer.

It generally takes a significant force to open the hinge from the flatten to the deployed states. The elastic shells provide this significant force. When the boom is flattened, the hinges are typically subjected to large strains (1% to 50%) that yield most materials.

For LHB where the strains are small, resilient materials can be used in the hinges. However, for LHB where the strain is large, materials that exhibit plasticity or ductility are more commonly used.

Layers—Single layer—The hinge and the elastic shell can butt against the shell material such that both of the shell and hinge are substantially one continuous non overlapped layer. Or, there can be an LHB with two or more layers, where, for example, the hinge and shell are separate stacked layers. Also, as can be seen, for example, in the LHB of FIG. 6 and FIG. 7, there can be LHB with more than two layers.

Exemplary LHB Hinge and Semi-Circular Shell Variations

The section drawings of FIG. 2 to FIG. 7 show hinge and semi-circular shell variations. The sections are shown as straight for simplicity, however, typically have about the curve of the entire LHB curved cross section in the LHB deployed state. In these drawings FIG. 2 to FIG. 7, the top represents the outer surface of the LHB, and the bottom, the inner portion of the LHB.

Figures 2, 3:
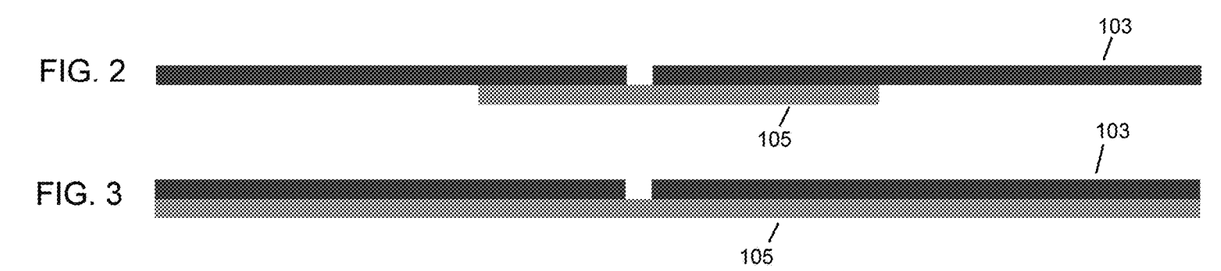
FIG. 2 is a section drawing showing an LHB hinge and semi-circular shell structure similar to the LHB of FIG. 1.
FIG. 3 is a section drawing showing an LHB hinge which extends around the entire LHB cross section.

FIG. 2 is a section drawing showing an LHB hinge 105 and semi-circular shell 103 structure similar to the LHB of FIG. 1.

FIG. 3 is a section drawing showing an LHB hinge 105 which extends around the entire LHB cross section.

Figures 4, 5, 6:
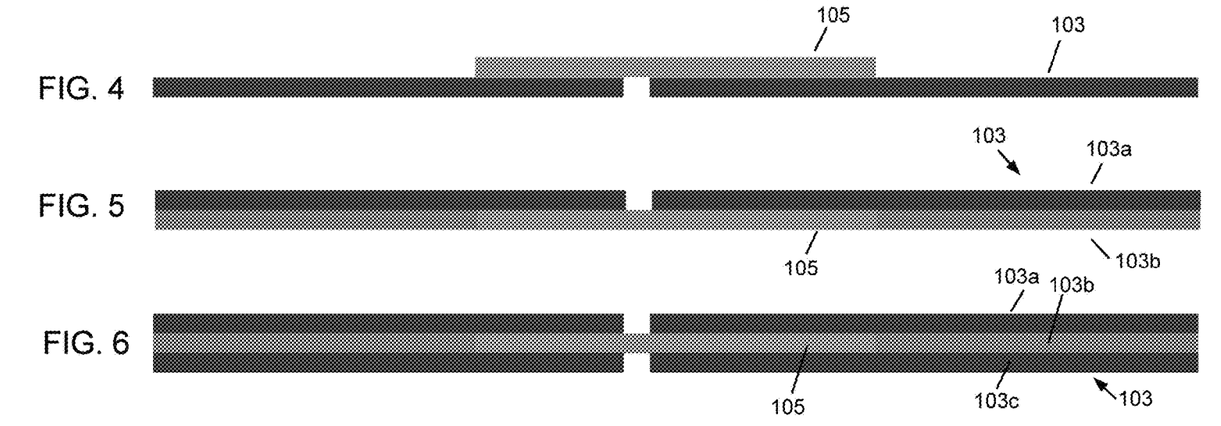
FIG. 4 is a section drawing showing an LHB hinge and semi-circular shell structure similar to the LHB of FIG. 1.
FIG. 5 is section drawing of an LHB where the semi-circular shell structure includes at least two layers, a first outer semi-circular shell layer, and a second inner semi-circular shell layer.
FIG. 6 is section drawing of an LHB where the semi-circular shell structure includes at least three layers, a first outer semi-circular shell layer, and a middle semi-circular shell layer, and an inner semi-circular shell layer.

FIG. 4 is a section drawing showing an LHB hinge 105 and semi-circular shell 103 structure similar to the LHB of FIG. 1, however the hinge is on the outer surface of the LHB.

FIG. 5 is section drawing of an LHB where the semi-circular shell 103 structure includes at least two layers, a first outer semi-circular shell layer 103a, and a second inner semi-circular shell layer 103b. The hinge 105 can be similar to the hinge of FIG. 1.

FIG. 6 is section drawing of an LHB where the semi-circular shell 103 structure includes at least three layers, a first outer semi-circular shell layer 103a, and a middle semi-circular shell layer 103b, and an inner semi-circular shell layer 103c. The hinge 105 can be similar to the hinge of FIG. 1.

Figure 7:
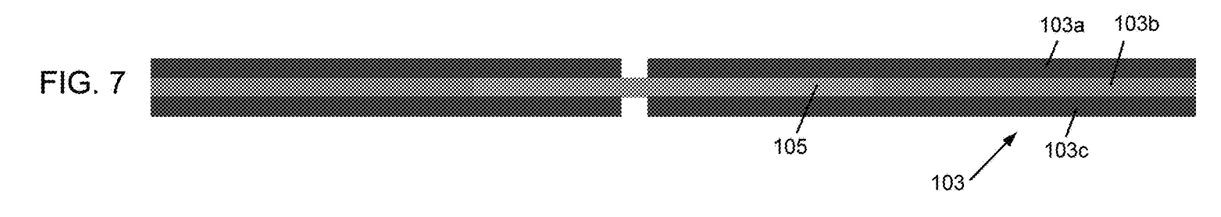
FIG. 7 is section drawing of an LHB where the semi-circular shell structure includes at least three layers, a first outer semi-circular shell layer, and a middle semi-circular shell layer, and an inner semi-circular shell layer.

FIG. 7 is section drawing of an LHB where the semi-circular shell 103 structure includes at least three layers, a first outer semi-circular shell layer 103a, and a middle semi-circular shell layer 103b, and an inner semi-circular shell layer 103c. The hinge 105 can be a living hinge created by the middle layer 103b itself.

Figure 8:
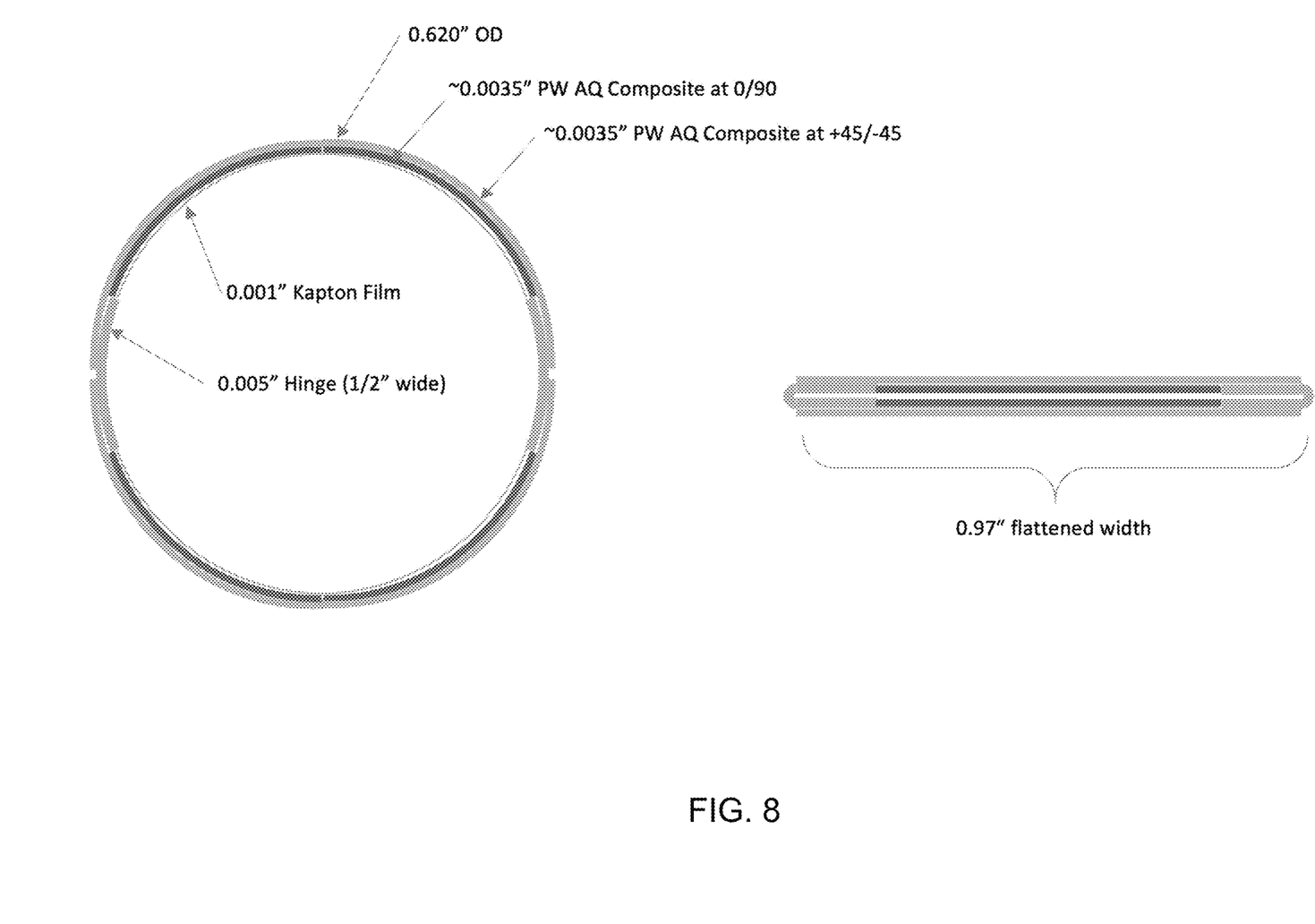
FIG. 8 is a drawing showing an exemplary LHB according to the structure of FIG. 7.

Example—FIG. 8 is a drawing showing an exemplary LHB according to the structure of FIG. 7. The LHB has an outer diameter of about 0.620". The outer semi-circular shell layer 103a was made from an about 0.0035" plain weave (PW) quartz fiber (AQ) composite at +45/−45 ply or fiber orientation.

(The industry abbreviation "AQ" was originally derived from AGY's trade name for fused quartz fibers, Astro Quartz, however, Astro Quartz is no longer manufactured. One suitable substitute is Quartzel, available from Saint Gobain of Louisville, Kentucky.)

The middle semi-circular shell layer 103b was made from an about 0.0035" PW AQ composite at 0/90 ply or fiber orientation. The inner semi-circular shell layer 103c was made from an about 0.001" Kapton™ film (a polyimide material). The about ½" wide, about 0.005" thick hinge was also made from a Kapton™ film. In the flattened state, the LHB of FIG. 8 has about a 0.97" width.

Figure 9:
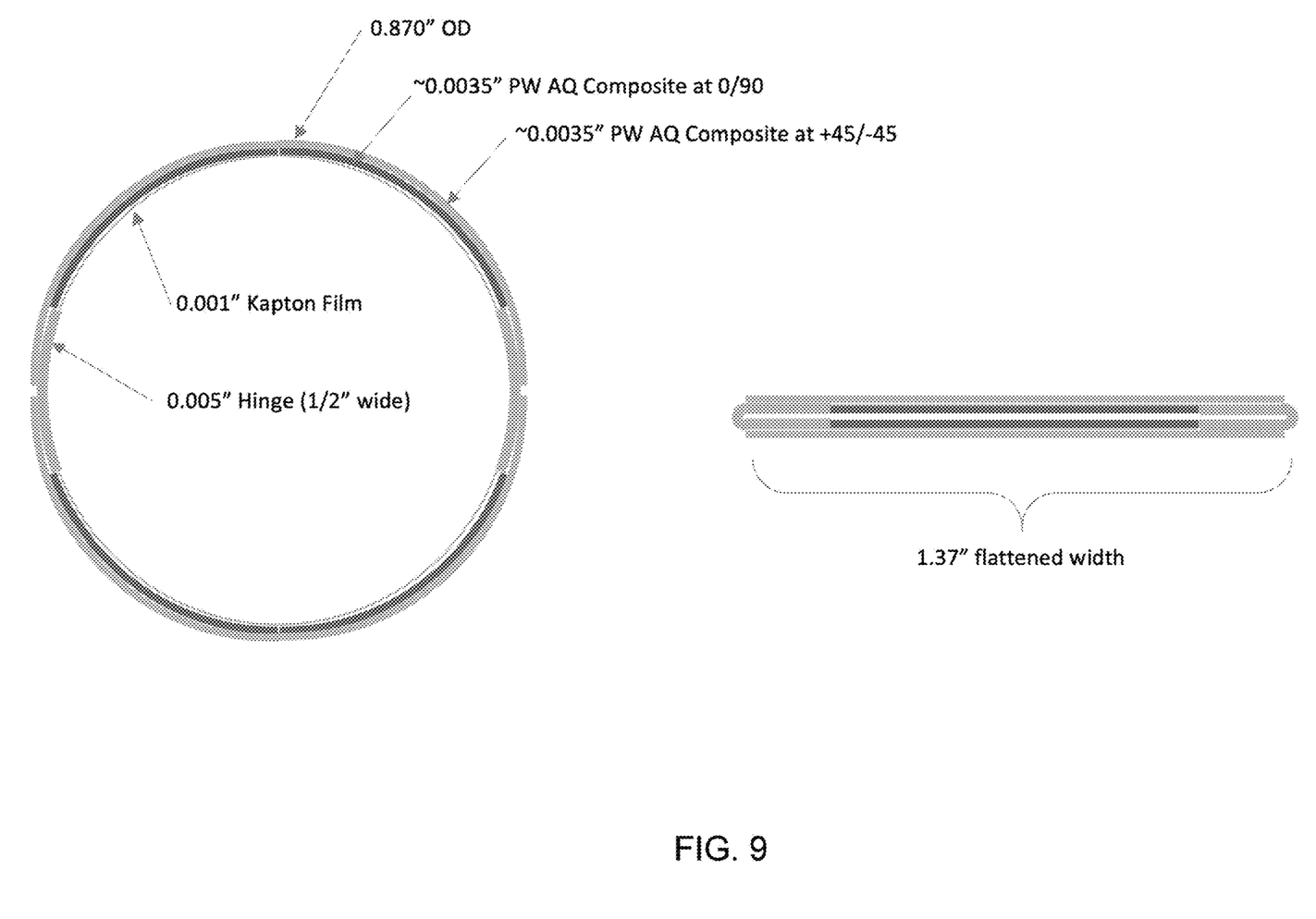
FIG. 9 is a drawing showing another larger diameter exemplary LHB according to the structure of FIG. 7.

Example—FIG. 9 is a drawing showing another larger diameter exemplary LHB according to the structure of FIG. 7. The LHB has an outer diameter of about 0.870". The outer semi-circular shell layer 103a was made from an about 0.0035" PW AQ composite at +45/−45 ply or fiber orientation. The middle semi-circular shell layer 103b was made from an about 0.0035" PW AQ composite at 0/90 ply or fiber orientation. The inner semi-circular shell layer 103c was made from a 0.001" Kapton™ film. This inner semi-circular shell layer 103c layer serves as a gas barrier and makes the boom air-tight. Composites alone are typically porous and leak under pressure. The about ½" wide, about 0.005" thick hinge was also made from a Kapton™ film. In the flattened state, the LHB of FIG. 8 has about a 1.37" width.

Hinges and fiber orientation—The hinges should be flexible so that they can flatten, but also stiff and strong in shear to enable boom rolling. As a boom is rolled, shear forces build up between the shells due to shell thickness and diameter differences. The hinges should be strong enough to not fail while subjected to these shear forces. A +45/−45 fiber orientation hinge material, for example, is particularly stiff and strong with respect to shear forces.

Exemplary Transition from a Deployed State to a Flattened State

Figure 10A:
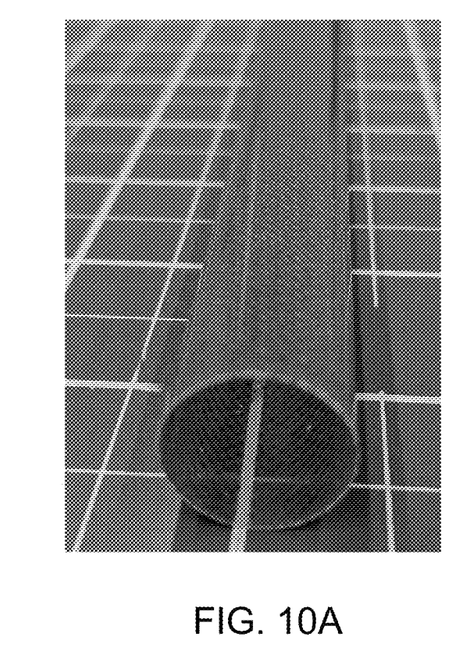
FIG. 10A is a drawing showing an exemplary LHB according to FIG. 8 in an about round deployed state.
Figure 10B:
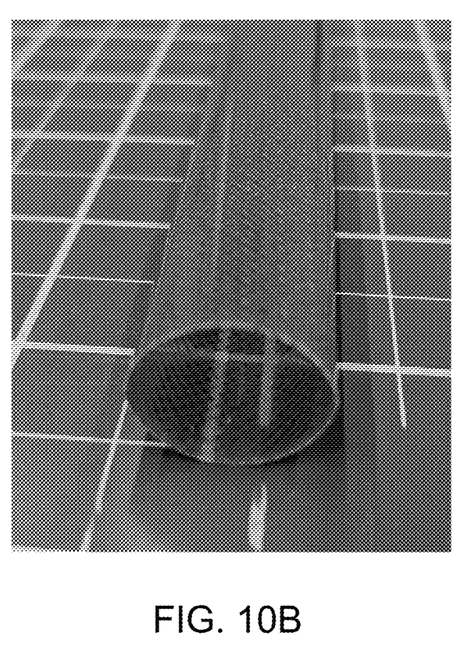
FIG. 10B is a drawing of the LHB of FIG. 10A slightly flattened out of round.
Figure 10C:
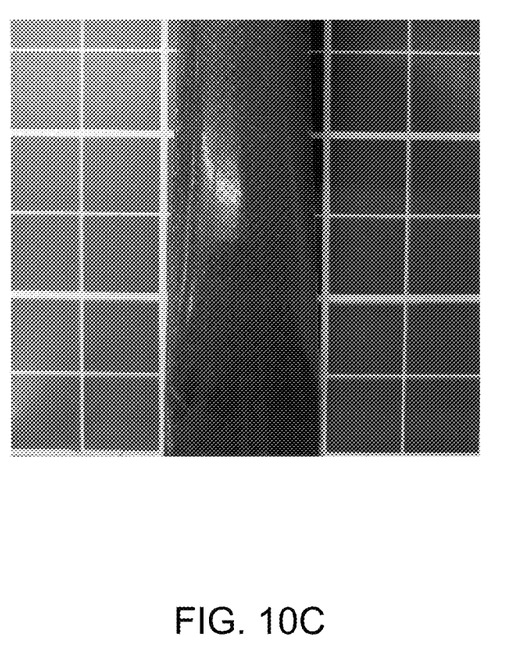
FIG. 10C is a drawing of the LHB of FIG. 10A flattened at one end.

FIG. 10A is a drawing showing an exemplary LHB according to FIG. 8 in an about round deployed state. FIG. 10B is a drawing of the LHB of FIG. 10A slightly flattened out of round. FIG. 10C is a drawing of the LHB of FIG. 10A flattened at one end. The flattening process can continue, typically followed by rolling of the LHB for relatively compact stowage as a rolled device.

Figure 11:
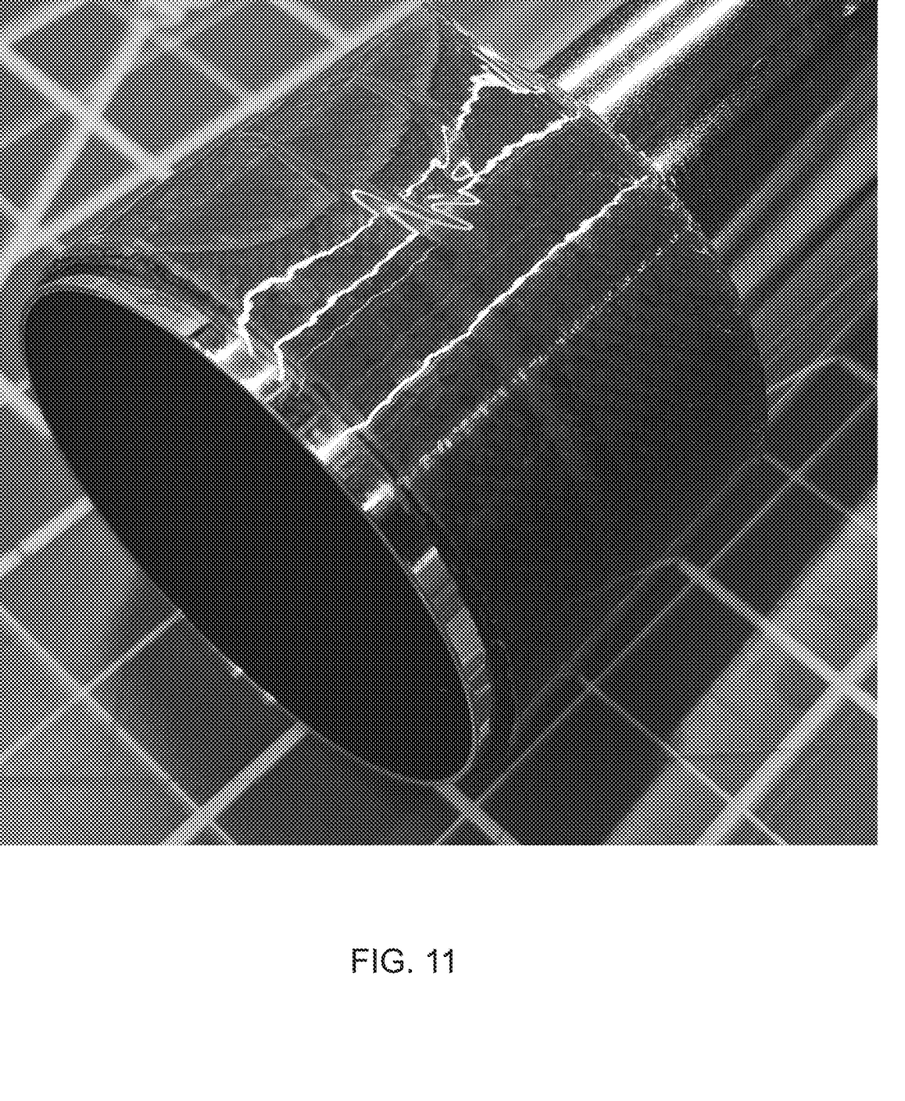
FIG. 11 is a drawing showing the LHB of FIG. 10A in the flattened state, rolled on a metal cylinder form.

FIG. 11 is a drawing showing the LHB of FIG. 10A in the flattened state, rolled on a metal cylinder form.

Figure 12:
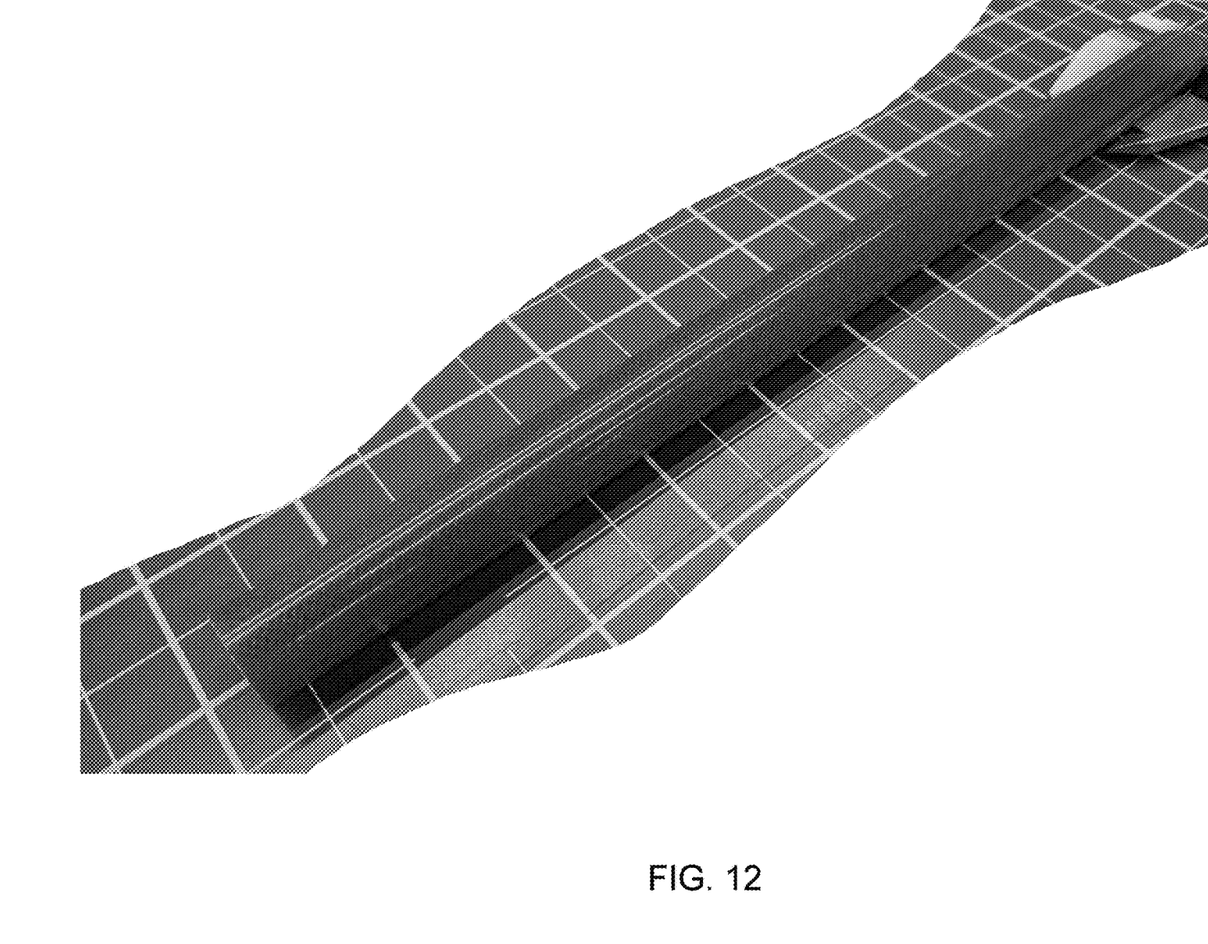
FIG. 12 is a drawing showing the LHB of FIG. 10A in an about round cross section deployed state.

FIG. 12 is a drawing showing the LHB of FIG. 10A in the about round cross section deployed state.

Deployed Living Hinge Boom

Where stored rolled from the flattened state, a living hinge boom according to the Application can self-deploy as it is un-rolled. As a living hinge boom according to the Application unrolls, spring forces of either or both of the pair of semi-circular shells and/or pair of hinges spring bias the structure to the open about circular cross section. In other words, a living hinge boom according to the Application can be spring biased to open to the about circular cross section extended state (also called a deployed state, typically when the living hinge boom is fully extended). On rolling for storage from a flattened state, the roll can proceed from a limited section of flattened boom, where, as the rolling process proceeds, the rolling process further flattens the boom as it is rolled.

Summary—With reference to FIG. 1, and in summary, A deformable boom device 100 includes a pair of shells 103, each shell 103 of a substantially same arc length. A pair of hinges 105 is mechanically coupled to the pair of shells to join the pair of shells 103 into an open cross section as deployed in an extended state, and into about a flat structure in a flattened state.

Computer based designs and simulations for LHB as described hereinabove can be provided on a computer readable non-transitory storage medium. A computer readable non-transitory storage medium as non-transitory data storage includes any data stored on any suitable media in a non-fleeting manner. Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A deformable boom device comprising:
   a pair of shells, each shell of a substantially same arc length; and
   a pair of hinges mechanically coupled to said pair of shells to join said pair of shells into an open cross section as deployed in an extended state, and into about a flat structure in a flattened state.

2. The deformable boom device of claim 1, wherein at least one of said pair of shells comprises an about semi-circular cross section.

3. The deformable boom device of claim 1, wherein a stiffness and strength of a deformable boom in said extended state is greater than a different stiffness and a strength of the deformable boom in said flattened state, said deformable boom deformable along a long axis.

4. The deformable boom device of claim 1, while at least in part in said flattened state, rolled into a roll for storage.

5. The deformable boom device of claim 1, wherein said pair of hinges comprises a long dimension of about less than 25% of a circumference of an outer diameter of a deformable boom.

6. The deformable boom device of claim 1, wherein said pair of hinges comprises a long dimension of more than about 80% of a circumference of an outer diameter of a deformable boom.

7. The deformable boom device of claim 1, wherein said pair of hinges comprises a strip disposed on an inner surface of said deformable boom device.

8. The deformable boom device of claim 1, wherein said pair of hinges comprises a strip disposed on an outer surface of said deformable boom device.

9. The deformable boom device of claim 1, wherein each hinge butts against a shell end, such that both of said shell and said hinge form one substantially continuous non overlapped layer.

10. The deformable boom device of claim 1, wherein said pair of hinges comprises a strip of an elastic material.

11. The deformable boom device of claim 1, wherein said pair of hinges comprises a strip of a ductile material.

12. The deformable boom device of claim 1, wherein said pair of hinges comprises a material having a plastic behavior.

13. The deformable boom device of claim 1, wherein said pair of hinges comprises a polyimide film material.

14. The deformable boom device of claim 1, wherein said pair of hinges comprises a +45/−45 fiber orientation.

15. The deformable boom device of claim 1, wherein said pair of hinges comprises a localized thinning of otherwise continuous shells.

16. The deformable boom device of claim 1, wherein said pair of shells comprises at least two layers.

17. The deformable boom device of claim 1, wherein said pair of shells comprises a resilient material.

18. The deformable boom device of claim 17, wherein said pair of shells comprises an elastic material.

19. The deformable boom device of claim 1, wherein said pair of shells comprises a composite material.

20. The deformable boom device of claim 19, wherein said pair of shells comprises a carbon composite material.

21. The deformable boom device of claim 19, wherein said pair of shells comprises a material having a different ply or fiber orientation.

22. The deformable boom device of claim 20, wherein a first shell layer comprises a +45/−45 ply or a +45/−45 fiber orientation and another shell layer comprises a 0/90 ply or a 0/90 ply fiber orientation.

23. The deformable boom device of claim 1, wherein said pair of shells does not intersect tangentially.

24. The deformable boom device of claim 1, wherein said pair of shells does not share a coincident center point.

* * * * *